Nov. 17, 1959 J. A. JOHNSON ET AL 2,913,147
LADING STORAGE AND DISCHARGE APPARATUS
Filed Sept. 13, 1954 3 Sheets-Sheet 3
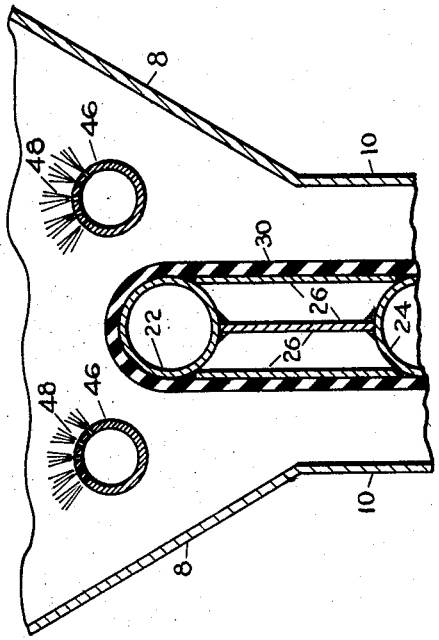
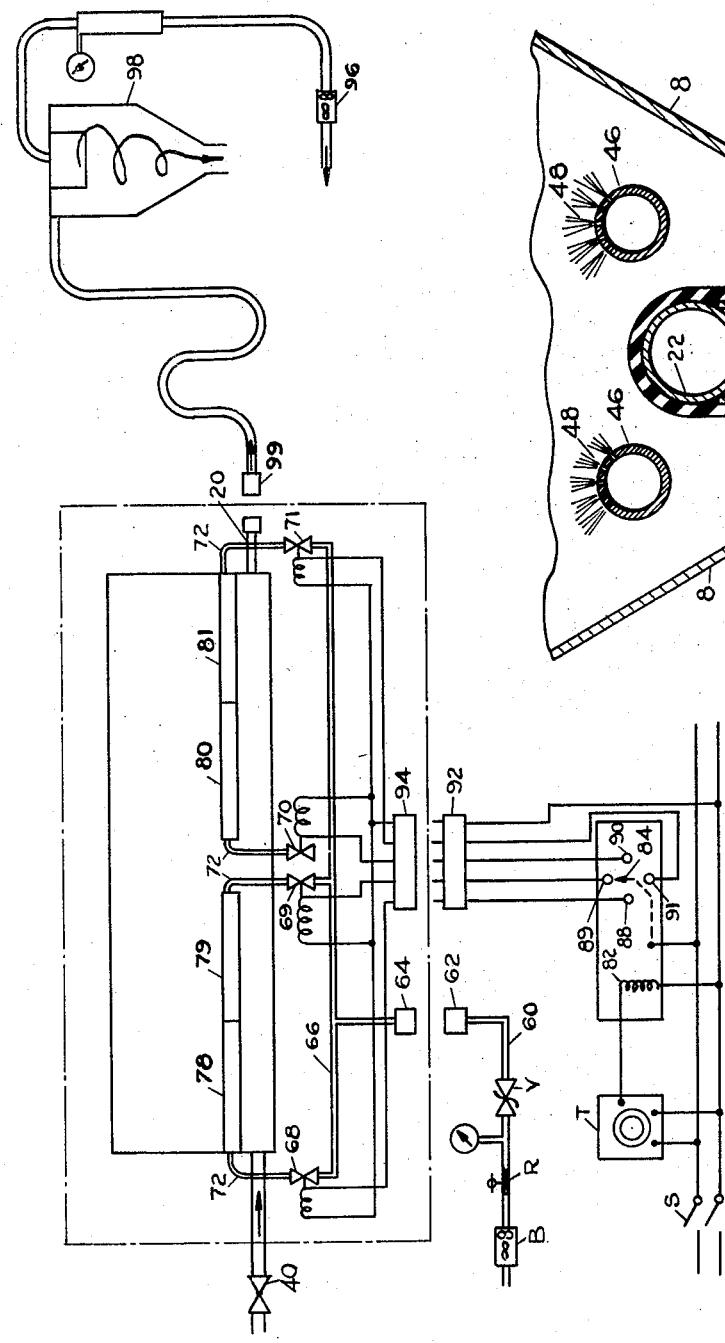
INVENTOR.
JOHN A JOHNSON
JERRY M GRUITCH
BY
ATTORNEY United States Patent Office 2,913,147
Patented Nov. 17, 1959

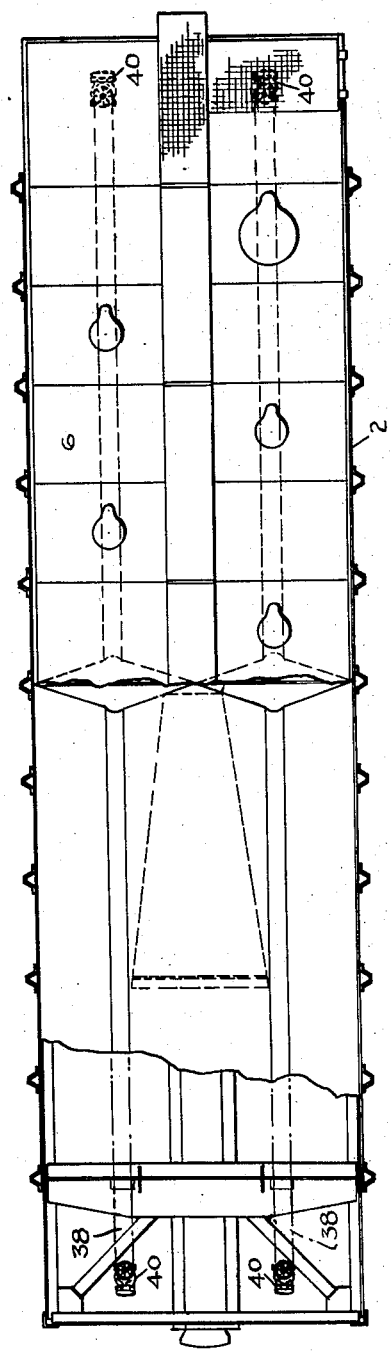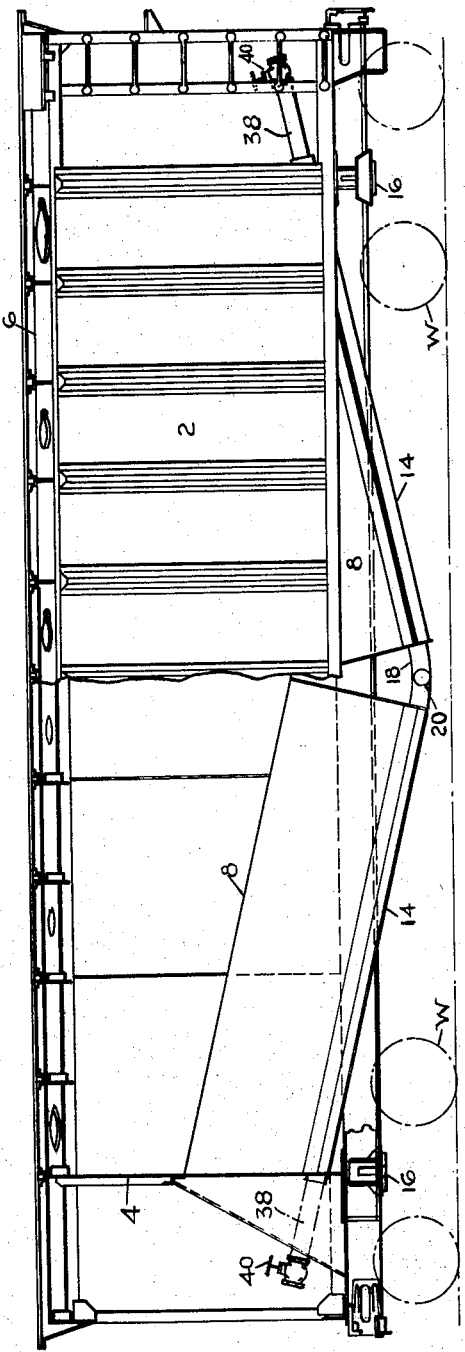

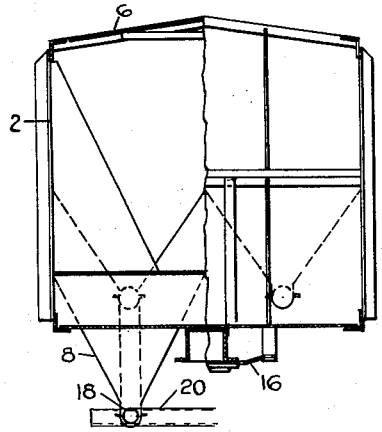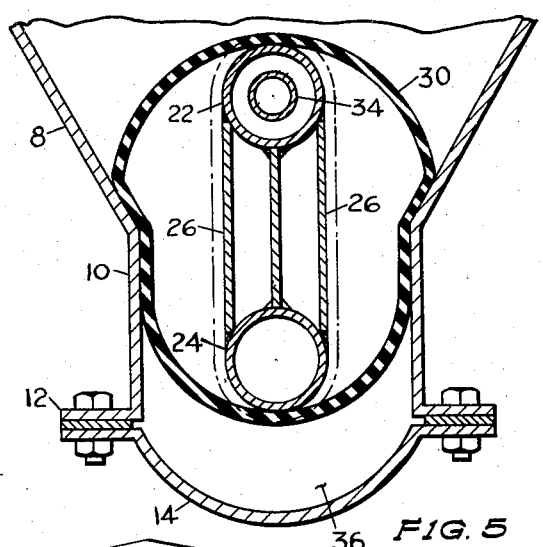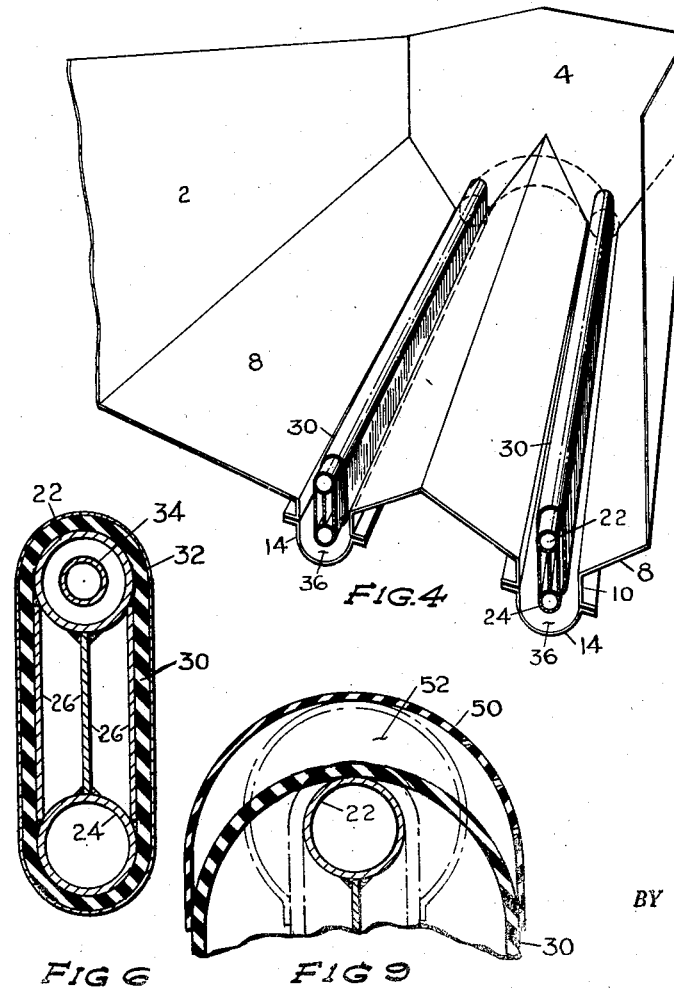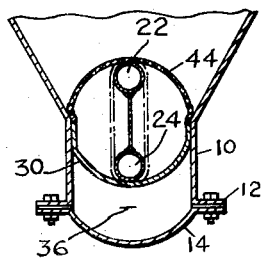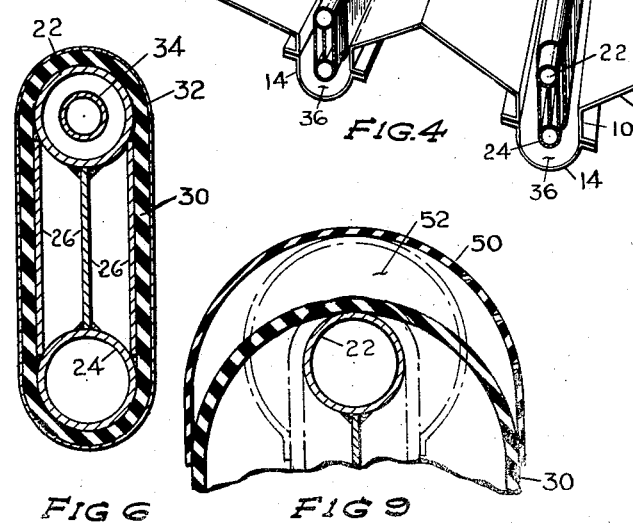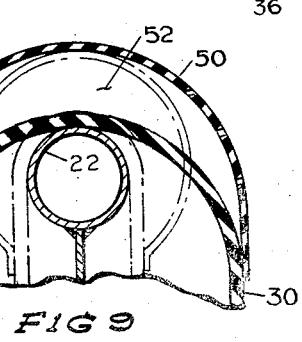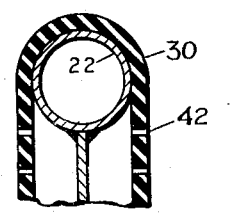

2,913,147

LADING STORAGE AND DISCHARGE APPARATUS

John A. Johnson, Short Hills, and Jerry M. Gruitch, Montclair, N.J., assignors to ACF Industries, Incorporated, New York, N.Y., a corporation of New Jersey Application September 13, 1954, Serial No. 455,629

19 Claims. (Cl. 222—70)

This invention relates to lading storage and discharge apparatus, particularly such apparatus for the transport of lading between the receiving and discharge points.

In recent years it has been realized that vast savings can be accomplished in the bulk transport and handling of commodities which have normally been handled in small individual packages. Practically all dry flowable materials can be handled more economically in bulk, for example, high priced commodities such as flour and sugar are especially adapted for bulk handling. These commodities, as well as other food-stuffs or chemicals, must be kept free of contamination and should be handled in containers which are always tightly closed even during discharge. Most granular commodities tend to pack when subjected to vibration incident to travel either over road or rail. It is an object, therefore, of the present invention to provide a storaging, transporting and discharging apparatus which will effectively break-up and discharge the lading.

A further object of the invention is the provision of lading storaging and discharging apparatus which is completely sealed against outside contamination.

A still further object of the invention is the provision of lading storaging and discharging apparatus in which the rate of flow of lading is controlled by an elastic valve.

A yet further object of the invention is the provision of a lading discharge control comprising an elastic tube which can be inflated and deflated at a predetermined rate.

These and other objects of the invention will be apparent to persons skilled in the art from a study of the following description and accompanying drawings, in which:

Fig. 1 is an elevational view partly in section showing the apparatus applied to a railway hopper car of the covered type.

Fig. 2 is a plan view of the apparatus of Fig. 1.

Fig. 3 is a partial and sectional view through the car.

Fig. 4 is a perspective view showing only the hopper discharge parts.

Fig. 5 is an enlarged sectional view taken through the hopper at the discharge outlet.

Fig. 6 is an enlarged sectional view showing the manner in which the elastic tube is sealed at its ends.

Fig. 7 is a sectional view showing a slight modification of the valve of Fig. 5.

Fig. 8 is a sectional view similar to Fig. 5, but showing a still further modification.

Fig. 9 is a partial sectional view showing a still further modified form of control valve.

Fig. 10 is a sectional view similar to Fig. 5, but showing independent aeration means and Fig. 11 is a diagrammatic showing of the system for discharging lading from the container or car.

Referring now to the drawings in detail it will be seen that the container for transporting the lading has been shown as a railway car supported at wheels W and formed with side walls 2, end walls 4, weatherproof roof 6 and sloping floor sheets 8 converging downwardly to form outlets having substantially vertical walls 10. These vertical walls terminate in outwardly directed flanges 12 to which is removably secured covers 14. Thus, in effect, a car or container is completely closed and no dirt can get into or material escape from the car. As shown in Fig. 1, the bottom of the hopper slopes downwardly from the bolsters 16 towards the center line of the car, however, if desired, these hoppers may be horizontal with end slope sheets secured to the bolster and directing the lading downwardly toward the outlet. As shown in Figs. 1 and 3, short pipes 18 join the hoppers on either side of the car center line and these pipes are intersected by a transverse pipe 20 so that lading may be removed from either side of the car.

In order to control the rate of lading discharge through the outlet onto the covers 14 a rigid metallic frame extends between and is attached to the end walls of the hopper in any suitable manner such as welding; and is formed of upper and lower pipes or tubes 22 and 24, respectively, joined together by parallel plates 26. Stretched over each frame is an elastic tube 30 which is sealed at its ends by being adhered to the frame adjacent its ends and clamped in position against the frame and hopper end walls by metallic sleeves 32 rigidly attached to the hopper end walls. Normally the tube will assume the line and dash position of Fig. 5, but when fluid under pressure is introduced through a connection 34 into the frame the elastic tube will be inflated and assume a position such as shown by solid lines in Fig. 5. With the tube inflated its side walls tightly engage and seal against the vertical walls 10 at the lower end of the hopper slope sheets 8 and thus, effectively prevent any lading flowing downwardly onto cover 14. Also, when the elastic tube is inflated it will form together with the lower ends of walls 10 and cover 14 a conduit 36, which conduit has direct access to short pipes 18 and transverse pipe 20. In order that a transporting current of fluid may be maintained in conduit 36, the ends 38 opposite short pipes 18 will be open to atmosphere through control valves 40. When the elastic tube 30 is deflated lading may drop from the hopper into the fluid current in the conduit 36. In other words the conduit 36, due to the inflation and deflation of elastic tube 30 will alternately become a conduit with closed sides and a conduit with open sides for reception of lading.

Most ladings will be broken up and fall by gravity toward the cover plate due to the inflation and deflation of elastic tube 30. However, some materials may require additional agitation and this may be obtained, as shown in Fig. 7, by placing small holes 42 in the elastic tube 30. These holes will direct jets of fluid upwardly into the lading when the tube is inflated. As an alternate form, agitation may also be increased, as shown in Fig. 8, by making the upper portion of tube 30 pervious as at 44. The openings in the top pervious portion 44 are extremely minute and fluid issuing therefrom will not be in the form of jets as in Fig. 7 but will be sufficient as to fluidize or aerate the material above the tube. In this manner fluid will escape from the inflated tube and agitate or fluidize the lading.

In some cases it may be desirable to have the agitation means independent of the pulsating elastic tube 30 and this may be done, as shown in Fig. 10 in which agitation pipes 46 are located on either side of the frame and are provided with holes 48 through which fluid jets may be directed upwardly into the lading.

In some instances it may be desirable to retain the benefits of the imperforate elastic tube 30 and attach thereto a separate pervious covering or cap 50 such as shown in Fig. 9. In this form fluid under pressure would be maintained in the space 52 and would constantly permit a drift of fluid upwardly through the lading to fluidize the same irrespective of the inflation or deflation of the elastic tube 30.

It is desirable that the elastic tubes 30 for the various outlet openings be inflated and deflated or in other words pulsated at a predetermined rate and sequence in order to obtain the optimum rate of flow of lading through the fluid carrying medium in conduit 36. One manner of controlling the pulsating of the elastic tubes is shown by the schematic hook-up of Fig. 11. In this system a positive pressure blower B supplies fluid through pressure reducer R to a control valve V. From the valve V the fluid is carried through a pipe line 60 to a coupling 62 adapted to mate with a similar coupling 64 on the container car. From the coupling 64 fluid will flow through pipe lines 66 to solenoid valves 68, 69, 70 and 71 from which valves fluid will flow through short pipes 72 either into or out of the flexible tube units indicated at 78, 79, 80 and 81. In order to have positive control over the solenoid valves, electrical apparatus is provided comprising a supply line with main switch S by means of which current may be supplied to the various control devices. As shown, timer T controls the energization of a magnet coil 82 which will operate a step by step switch 84 making contact with contact points 88, 89, 90 and 91. These various contact points are joined by wires to a plug 92 which is adapted to be inserted in receptacle 94 thereby connecting the various track-side circuits with the car carried circuits. To produce the lading carrying fluid a positive blower 96 is provided and connected through suitable piping to a separator 98 and plug in 99 adapted to be connected with the car carried pipe 20.

In operation the blower B will be started supplying fluid through the connections and solenoid valves which are normally open to the various elastic tubes 30 represented by numerals 78, 79, 80, and 81. These tubes will then be fully inflated establishing a closed conduit 36 between the tubes and the covers 14. After this conduit is established blower 96 is started thereby creating a fluid current entering at valves 40 and flowing through conduits 36, pipes 18, 20 and connection 99 to the separators 98 wherein the lading will be deposited. Upon throwing the main switch S the timer T will function and at a predetermined rate the solenoid coil 82 wil cause switch 84 to sweep around contacts 88, 89, 90 and 91. Whenever the contact 84 is in contact with a point such as 89, the solenoid valve corresponding thereto, in this case 69, will be closed thus cutting off the supply of fluid under pressure to the flexible tube 30 of element 79 and allowing the fluid therein to be quickly exhausted to atmosphere. In this manner, as the switch 84 sweeps over the contacts the flexible tubes 30 of units 78, 79, 80, and 81 will be inflated and deflated or in other words pulsated to supply or cut off lading flowing into the fluid current or conduit 36. The sequential pulsating of the tubes will directly tend to cause lading to flow downwardly toward the tube and thence into conduit 36 and also the pulsating tube will, due to its contact with the hopper walls, cause the hopper walls to shift sufficiently to break-up any bridging that may occur. However, for extremely hard to handle materials the extra agitation means of Figs. 7 to 10 may be necessary.

While the invention has been described more or less in detail with specific reference to the figures it is obvious that various modifications may be made without departing from the scope of the invention as defined by the appended claims.

What is claimed is:

1. In an apparatus for storing and discharging flowable lading material the combination of a container formed with downwardly converging floors having their lower inner edges spaced apart to define an elongated hopper outlet, an approximately horizontally extending, elongated elastic tube supported in said outlet having its longitudinal axis substantially parallel to the outlet and the tube being inflatable to a size filling the space between the lower inner edges of the floors to prevent discharge of lading from the container, means joining the floors beneath said tube and defining therewith a discharge conduit, and means to control the size of said tube to thereby control the rate of discharge of lading transversely of the tube into said conduit 2. In an apparatus for storing and discharging flowable lading material the combination of a container formed with downwardly converging floors having their lower inner edges spaced apart to define an elongated hopper outlet, an approximately horizontally extending, elongated elastic tube located in the space between the floor edges and having its longitudinal axis substantially parallel to the outlet, means to inflate said tube to fill the space and prevent discharge of lading transversely of the tube from the outlet, means joining the floors beneath said tube and defining therewith a discharge conduit, and means to deflate said tube for discharge of lading into said conduit.

3. The structure of claim 2 characterized in that control means is associated with said inflation and deflation means to operate the same at a predetermined frequency to obtain a predetermined rate of lading discharge, said control means further including means for varying said frequency of inflation and deflation.

4. In an apparatus for storing and discharging flowable lading material the combination of a container formed with downwardly converging floors having their lower inner edges spaced apart to define an elongated hopper outlet, an approximately horizontally extending, elongated elastic tube located in the space between the floor edges and having its longitudinal axis substantially parallel to the outlet, means to inflate said tube to fill the space and prevent discharge of lading from the outlet, means joining the floors beneath said tube and defining therewith a discharge conduit, means maintaining a flow of fluid through said conduit during discharge, and means to deflate said tube for discharge of lading transversely of the tube from said hopper into said fluid.

5. The structure of claim 4 characterized in that said fluid flow means maintains the flow of fluid substantially constant and control means is associated with said inflation and deflation means to operate the same at a predetermined frequency rate, said control means further including means for varying said frequency of inflation and deflation.

6. The structure of claim 4 characterized in that said tube is formed with a pervious portion to agitate the lading and increase its flowability.

7. The structure of claim 6 additionally characterized in that said pervious portion operates independently of the inflation or deflation of said tube.

8. In apparatus for storing and discharging flowable lading material the combination of a container formed with a plurality of elongated approximately horizontally extending hopper discharge outlets, an elongated elastic tube extending longitudinally of each discharge outlet, a discharge conduit extending beneath each tube, means to inflate each tube to elongated, approximately cylindrical form and having its longitudinal axis substantially parallel to the longitudinal axes of the discharge outlets to prevent discharge of lading, means to deflate each tube to allow discharge of lading transversely of the tube into the associated conduit, means to maintain a substantially constant rate of flow of fluid through each conduit, and means to inflate and deflate the tubes in a predetermined sequence and rate.

9. In apparatus for storing and discharging flowable lading material the combination of a container formed with an elongated approximately horizontally extending discharge outlet, an elongated frame disposed in said outlet with its longitudinal axis substantially parallel to the longitudinal axis of the outlet, an elastic tube carried by said frame and sealed at its ends with respect thereto, and means to inflate and deflate said tube to close and open the discharge outlet thereby controlling the lading discharge transversely of the tube, said tube being formed with small openings adjacent its upper portion to agitate the lading adjacent thereto when said tube is inflated.

10. In apparatus for storing and discharging flowable lading material the combination of a container formed with an elongated discharge outlet, an elongated frame disposed in said outlet with its longitudinal axis substantially parallel to the longitudinal axis of the outlet, an elastic tube carried by said frame and sealed at its ends with respect thereto, and means to inflate and deflate said tube to close and open the discharge outlet thereby controlling the lading discharge transversely of the tube, said tube having the major portion thereof impervious and having a minor pervious portion attached thereto to form a lading agitation means.

11. In apparatus for storing and discharging flowable lading material the combination of a container formed with an elongated discharge outlet, a frame disposed in said outlet with its longitudinal axis substantially parallel to the longitudinal axis of the outlet, and impervious elastic tube covering said frame and sealed with respect thereto, a pervious cap secured to the upper portion of said tube, means to supply fluid under pressure to said cap to agitate the lading, and means to supply pulsating fluid pressure to said tube to inflate and deflate said tube thereby controlling the lading discharge transversely of the tube through the outlet.

12. In apparatus for storing and discharging flowable lading material the combination of a container formed with an elongated approximately horizontally extending discharge outlet, means closing said outlet, an elastic tube located in said outlet above said closing means, and means to inflate said tube to close the outlet above said closing means and form with said closing means a discharge conduit.

13. In apparatus for storing and discharging flowable lading material the combination of a container formed with an elongated approximately horizontally extending discharge outlet, means closing said outlet, an elastic tube located in said outlet above said closing means, means to inflate said tube to close the outlet above said closing means and form with said closing means a discharge conduit, and means to deflate said tube for passage of lading beneath said tube and onto said closing means.

14. In apparatus for storing and discharging flowable lading material the combination of a container formed with an elongated approximately horizontally extending discharge outlet, an elongated frame disposed in said outlet, an elastic tube carried by said frame and sealed at its ends with respect thereto, means adjacent said tube to agitate the lading, and means to inflate and deflate said tube to close and open the discharge outlet thereby controlling the discharge of the agitated lading.

15. In apparatus for storing and discharging flowable lading material the combination of a container formed with an elongated approximately horizontally extending discharge outlet, an elongated frame disposed in said outlet, an elastic tube carried by said frame and sealed at its ends with respect thereto, means adjacent said tube to agitate the lading, and means to inflate and deflate said tube to close and open the discharge outlet thereby controlling the discharge of the agitated lading, said first named means operating independently of said tube and being supplied with fluid under pressure.

16. In an apparatus for storing and discharging flowable lading material, the combination with a container having downwardly converging floors, said floors having lower inner edges spaced apart and defining an approximately horizontally extending, elongated hopper outlet, of an elongated elastic tube, means supporting said tube adjacent and in spaced parallel relation to said inner edges, said tube being inflatable to a size and position in which it contacts both of said lower inner edges to prevent discharge of lading from the container, means for inflating and deflating said tube, agitation tube means formed with upwardly directed openings and supported above and in parallel spaced relation to said first mentioned tube and to said lower inner edges for directing fluid upwardly into the lading to fluidize the same, and means for supplying fluid to said agitation tube means.

17. In an apparatus for storing and discharging flowable lading material the combination of a container formed with downwardly converging floors having the lower edges thereof spaced apart to define an elongated hopper outlet, spaced apart substantially vertical walls depending from said lower edges, a cover connecting said walls, an elongated frame disposed in said outlet in spaced relation to said edges, said walls and said cover, said elongated frame having its longitudinal axis substantially parallel to the longitudinal axis of the outlet, an elastic tube carried by said frame and sealed at its ends with respect thereto, and means to inflate and deflate said tube to close and open the discharge outlet thereby controlling the lading discharge transversely of the tube, said tube when inflated bearing against said vertical walls and forming with said walls and cover a discharge conduit.

18. The structure of claim 17 characterized in that the lower portion of said tube above said cover is impervious and the upper portion is pervious to the passage of fluid under pressure.

19. The apparatus of claim 17 characterized in that the upper portion of said frame is disposed above said lower edges and said tube when inflated overlaps said floors adjacent said edges.

References Cited in the file of this patent

UNITED STATES PATENTS

| | | |
|---|---|---|
| 1,570,795 | Tainton | Jan. 26, 1926 |
| 2,081,651 | Tamminga et al. | May 25, 1937 |
| 2,353,346 | Logan | July 11, 1944 |
| 2,527,466 | Townsend et al. | Oct. 24, 1950 |
| 2,598,207 | Bailey et al. | May 27, 1952 |
| 2,609,125 | Schemm | Sept. 2, 1952 |
| 2,642,215 | Carter | June 16, 1953 |
| 2,660,341 | Norbom | Nov. 24, 1953 |
| 2,732,099 | Davis | Jan. 24, 1956 |
| 2,756,906 | Carter | July 31, 1956 |